United States Patent
Swor

[11] Patent Number: 6,029,387
[45] Date of Patent: Feb. 29, 2000

[54] FISHING ACCESSORY AND ASSOCIATED METHODS

[76] Inventor: G. Michael Swor, 4485 S. Shade Ave., Sarasota, Fla. 32431

[21] Appl. No.: 09/106,589

[22] Filed: Jun. 29, 1998

[51] Int. Cl.⁷ .............................. A01K 97/00; B26B 3/00
[52] U.S. Cl. .................................. 43/4; 30/278; 30/280; 30/314; 83/856; 43/57.1
[58] Field of Search .............................. 43/1, 4, 25, 25.2, 43/57.1, 57.2; 30/122, 278, 280, 314, 315, 317, 289, 294; 83/856, 578; 112/285; 7/106, 103, 158; 223/109 R, DIG. 4; 606/128

[56] References Cited

U.S. PATENT DOCUMENTS

| | | | |
|---|---|---|---|
| D. 353,672 | 12/1994 | Swor | D24/145 |
| 1,582,196 | 4/1926 | Van Blarcom | 43/25.2 |
| 2,144,122 | 1/1939 | Pflueger | 43/25 |
| 2,274,978 | 3/1942 | Currier | 83/578 |
| 2,556,403 | 6/1951 | Sokolik | 43/25.2 |
| 3,902,510 | 9/1975 | Roth . | |
| 4,726,140 | 2/1988 | Mears | 43/25 |
| 4,730,409 | 3/1988 | Mitchell et al. | 43/25 |
| 4,896,422 | 1/1990 | Sheehan et al. | 30/290 |
| 4,969,893 | 11/1990 | Swor . | |
| 5,016,401 | 5/1991 | Mangus . | |
| 5,182,874 | 2/1993 | Powell | 43/25 |
| 5,385,569 | 1/1995 | Swor | 606/148 |

*Primary Examiner*—Jack W. Lavinder
*Attorney, Agent, or Firm*—Allen, Dyer, Doppelt, Milbrath & Gilchrist, P.A.

[57] ABSTRACT

A fishing accessory is provided for temporarily parking a fishing implement having a pointed end, for cutting tackle from fishing line, and for cutting fishing line. The fishing accessory includes a generally planar base and a support structure affixed atop the base. At least a portion of the support structure's bottom surface is supported in spaced relation from the base top surface to form a notch therebetween. A perforable material is affixed atop the support structure and is adapted to park a pointed end of a fishing implement thereupon. A cutter is affixed to the support structure, so that at least a portion of its cutting surface is exposed within the notch, for cutting fishing line thereagainst.

11 Claims, 2 Drawing Sheets

FISHING ACCESSORY AND ASSOCIATED METHODS

BACKGROUND OF THE INVENTION

1. Field of the Invention

This invention relates to an accessory for use while fishing, and, more particularly, an accessory and associated methods for temporarily parking tackle, removing tackle from a line, and cutting line.

2. Description of Related Art

Changing tackle, including hooks and lures, is commonly done while fishing, and often needs to be accomplished under conditions when it is difficult to locate and use a cutting device quickly and efficiently. This same problem arises when it is desired to cut leaders from spools of various-gauge line.

In addition, after changing tackle, storing the removed tackle can present a difficulty, especially if the tackle is planned for subsequent use that day and the fisherman does not desire to store it in a tackle box. Fishermen then frequently store the tackle in an unsafe location, such as on the floor or boat console.

SUMMARY OF THE INVENTION

It is therefore an object of the present invention to provide an accessory for aiding in the removal of tackle from a fishing line.

It is a further object to provide such an accessory for cutting fishing line.

It is an additional object to provide such an accessory for temporarily parking a fishing implement having a sharp end.

It is another object to provide a method of cutting tackle from fishing line.

It is yet a further object to provide a method of cutting fishing line.

It is yet an additional object to provide a method of temporarily parking a fishing implement having a sharp end.

These and other objects are achieved by the fishing accessory and associated methods of the present invention.

The fishing accessory combines a tackle holder for temporary parking of fishing tackle and a cutter for cutting fishing line. In a preferred embodiment, the fishing accessory further includes a flexible supporting layer having a top and bottom surface with an adhesive material on the bottom surface.

In accordance with the stated and other objects, the present invention is described in the following with reference to the accompanying drawings.

DETAILED DESCRIPTION OF THE PREFERRED EMBODIMENTS

A detailed description of the preferred embodiments of the present invention will be presented with reference to FIGS. 1–6.

Figure 1:
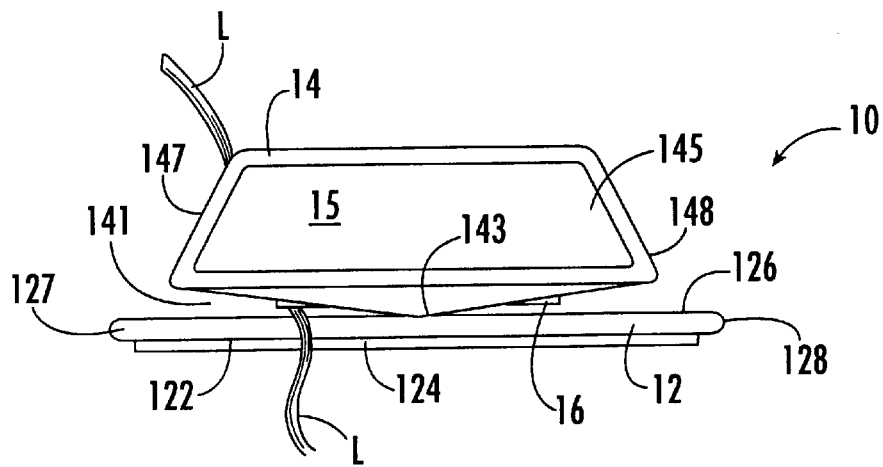
FIG. 1 is a side view of a fishing accessory in accordance with the present invention.
Figure 2:
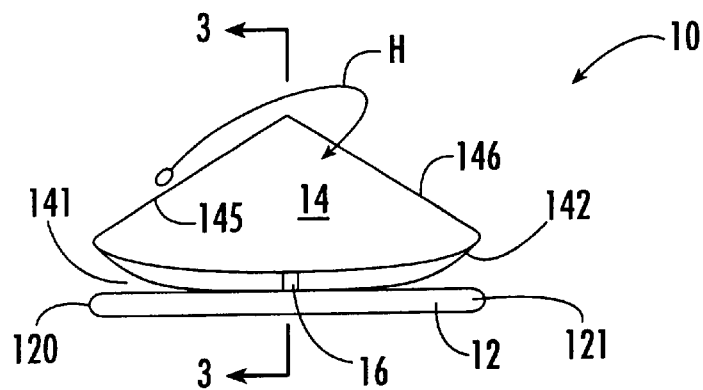
FIG. 2 is an end view of the fishing accessory of FIG. 1, shown holding a hook.
Figure 3:
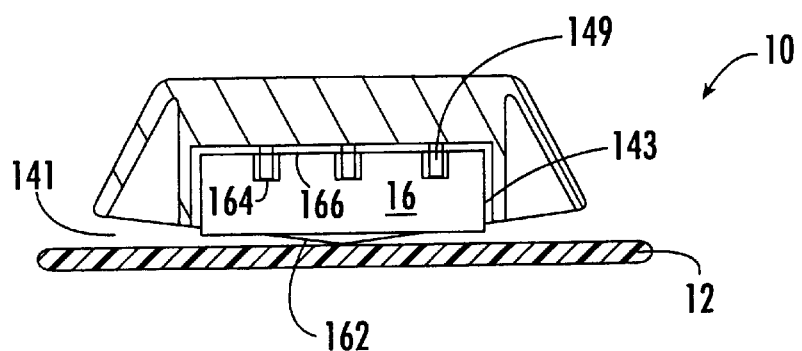
FIG. 3 is a cross-sectional view of the fishing accessory taken through the center peak along line 3—3 of FIG. 2.
Figure 4:
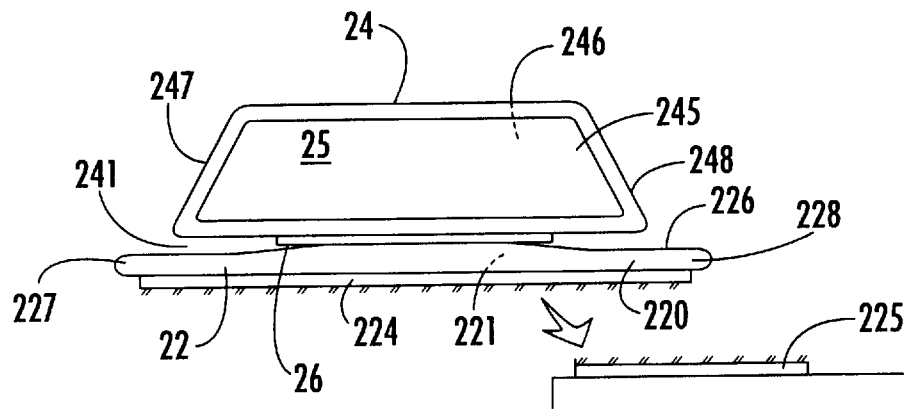
FIG. 4 is a side view of an alternate embodiment of the fishing accessory.
Figure 5:
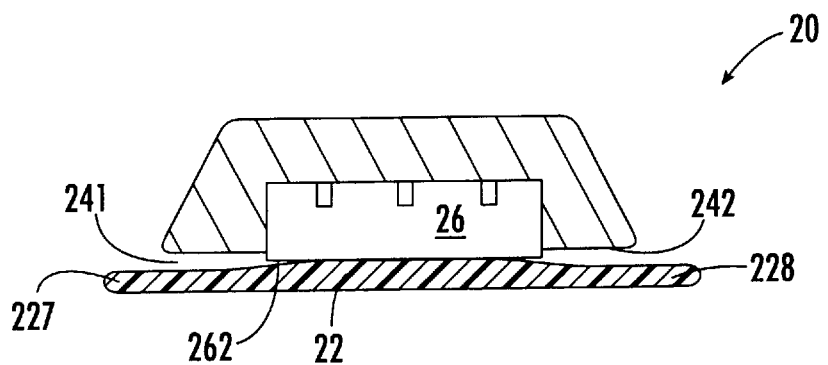
FIG. 5 is a cross-sectional view of the embodiment of the fishing accessory of FIG. 4 taken through the center peak.
Figure 6:
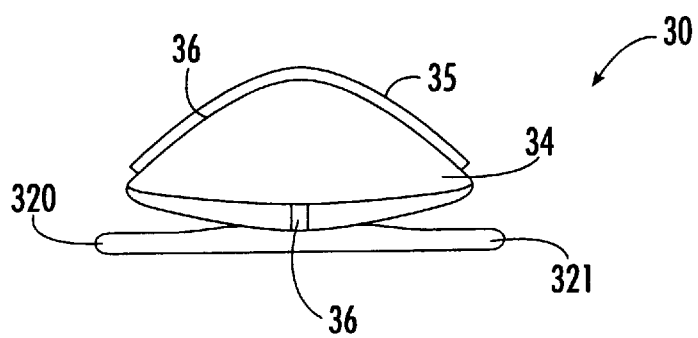
FIG. 6 is an end view of a third embodiment of the fishing accessory.

FIGS. 1–3 depict a first embodiment of a fishing accessory 10, and FIGS. 4 and 5 depict a second embodiment 20 thereof. In both embodiments the fishing accessory comprises a semiflexible generally planar base 12,22, preferably made of a plastic. The base 12,22 has two generally parallel sides 120,121;220,221 and two generally parallel ends 127, 128;227,228 that meet the sides 120,121;220,221 in a generally perpendicular orientation to form a substantially rectangular element in top plan view.

Affixed to the bottom surface 122,222 is a material for adhering to a surface, such as an adhesive material 124 (FIG. 1). Alternatively (FIG. 4), a first element of a hook-and-loop-type material 224 such as is well known in the art as Velcro® is affixed to the bottom surface 222 for mating with a second element of the hook-and-loop-type material 225 that is placed in a desired location, such as, but not limited to, a surface area on a boat, tackle box, or item of clothing.

Affixed to the top surface 126,226 of the base 12,22 is a portion of the bottom surface 142,242 of support structure 14,24. Another portion of the bottom surface 142,242 is supported in spaced relation from the base's top surface 126,226 to form a notch 141,241 therebetween. In the first embodiment 10 (FIG. 1), the bottom surface 142 comprises a concave-upward surface that is affixed along its lowest portion 143 to the base's top surface 126. In the second embodiment 20 (FIG. 4), the bottom surface 242 comprises a generally planar surface, and the base's top surface 226 has a downward curvature from a central region toward the first 227 and second 228 ends.

The support structure 14,24 has a top surface that comprises a pair of generally planar top surfaces 145,146;245, 246 that meet along a central line to form a tentlike structure sloping downward toward the base's sides 120,121;220,221. In a third embodiment 30 (FIG. 6), the top surface 36 comprises a downward-curving surface toward the base's sides 320,321. The support structure 14,24 further has generally parallel sides 147,148;247,248 that connect the top surfaces 145,146;245,246 and bottom surface 142,242 to form an enclosed structure.

To each of the top surfaces 145,146;245,246;36 is affixed a layer of perforable material, such as foam 15,25,35, which is adapted to park a pointed end of a fishing implement H thereupon. An advantage of the tentlike support structure 14,24 is that a hook H or tackle can be parked in the foam 15,25 so that, when the pointed end is inserted into a foam layer 15,25 affixed atop one top surface 145,245, the nonpointed end thereof can stably rest upon the foam layer 15,25 affixed atop the other top surface 146,246 (see FIG. 2). Similarly, in the third embodiment, an advantage of the downward-curving top surface 36 of the support structure 34 is that a hook H or tackle can be parked in the foam 35 so that, when the pointed end is inserted along one sloping side, the nonpointed end can be stable supported along the other sloping side.

In each embodiment 10,20,30, the support structure 14,24,34 preferably comprises two halves that are snap fit together along 20 the center line (FIG. 3). Each half has a depression 143 in an inward-facing surface, with top tabs 149 projecting downward into the depression 143. When assembled, the inward-facing surfaces meet, with the depressions 143 leaving a space therebetween.

The fishing accessory 10,20 further comprises a cutter 16,26 affixed to the support structure 14,24. The cutter 16,26 comprises, in a preferred embodiment, a single-edged blade having a cutting surface 162,262 facing downward, and oriented so that the blade 16,26 is generally parallel to the base's sides 120,121;220,221. In a particular embodiment (FIG. 3), the blade 16 is snap-fit between the two halves of the support structure 14 by placing the blade 16 within the depressions 143 in the support structure 14 and positioning the tabs 149 in the depressions 143 within the slots 164 that are located along the top 166 of the blade 16.

The blade 16,26 is positioned so that at least a portion of the cutting surface 162,262 is exposed within the notch 141,241, enabling fishing line L to be cut thereagainst by slipping the line L into the notch 141,241 and applying pressure to the line L against the blade's cutting surface 162,262.

Thus it can be seen that the fishing accessory 10,20,30 of the present invention, and the methods of using it, achieve the stated objects by permitting fishing line to be easily and safely cut and by providing a safe and convenient location for temporarily parking a fishing implement having a sharp end, such as a hook or tackle.

It may be appreciated by one skilled in the art that additional embodiments may be contemplated, including alternative shapes of the support structure and base.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiment thereof, and the advantageous new and useful results obtained thereby, the new and useful constructions, and reasonable mechanical equivalents thereof obvious to those skilled in the art, are set forth in the appended claims.

What is claimed is:

1. A method for cutting fishing line and for parking a fishing implement comprising the steps of:
    affixing a cutting assembly to a surface convenient for cutting fishing line thereupon, the cutting assembly comprising:
        a base having a top surface;
        a support structure having a portion of a bottom surface affixed atop the base, least a portion of the bottom surface supported in spaced relation to the base top surface to form a notch therebetween;
        a perforable material affixed atop the support structure adapted to park a pointed end of a fishing implement thereupon; and
        a cutter affixed to the support structure, the cutter having a cutting edge at least partially exposed within the notch;
    passing the fishing line into the notch; and
    cutting the fishing line against the cutting edge.

2. The method recited in claim 1, further comprising the step of inserting a pointed end of a fishing implement into the perforable material, for parking the fishing implement safely.

3. The method recited in claim 1, wherein the support structure has a top surface comprising a pair of generally planar surfaces meeting along a central line to form a generally tentlike structure, and wherein the perforable material comprises a pair of perforable layers, one layer affixed atop each support structure planar surface.

4. The method recited in claim 1, wherein the base has a pair of generally parallel sides, and the support structure has a top surface sloping downwardly from a central region toward each of the base sides.

5. The method recited in claim 1, wherein the perforable material comprises a foam material.

6. The method recited in claim 1, wherein the cutter comprises a blade having a sharp edge affixed to the support structure so that the sharp edge is oriented downward toward and at least partially projecting beneath the support structure bottom surface.

7. The method recited in claim 1, further comprising means affixed to a bottom surface of the base for attaching the base to a desired surface.

8. The method recited in claim 7, wherein the attaching means comprises an adhesive material.

9. The method recited in claim 7, wherein the attaching means comprises one section of a hook-and-loop-type fastener, for attaching the base to a corresponding section of a hook-and-loop-type fastener.

10. The method recited in claim 1, wherein the support structure bottom surface comprises a concave-upward surface affixed along a low portion thereof to the base top surface.

11. The method recited in claim 1, wherein the support structure bottom surface comprises a generally planar surface and the base top surface has a downward curvature from a central region to a first end and a second end generally parallel to the first side, the first and the second ends generally perpendicular to the cutting surface.

* * * * *